3,398,964
STUFFING BOX
James Trefil, Berwyn, Ill., assignor to Crane Co.,
Chicago, Ill., a corporation of Illinois
Filed May 4, 1966, Ser. No. 547,544
11 Claims. (Cl. 277—21)

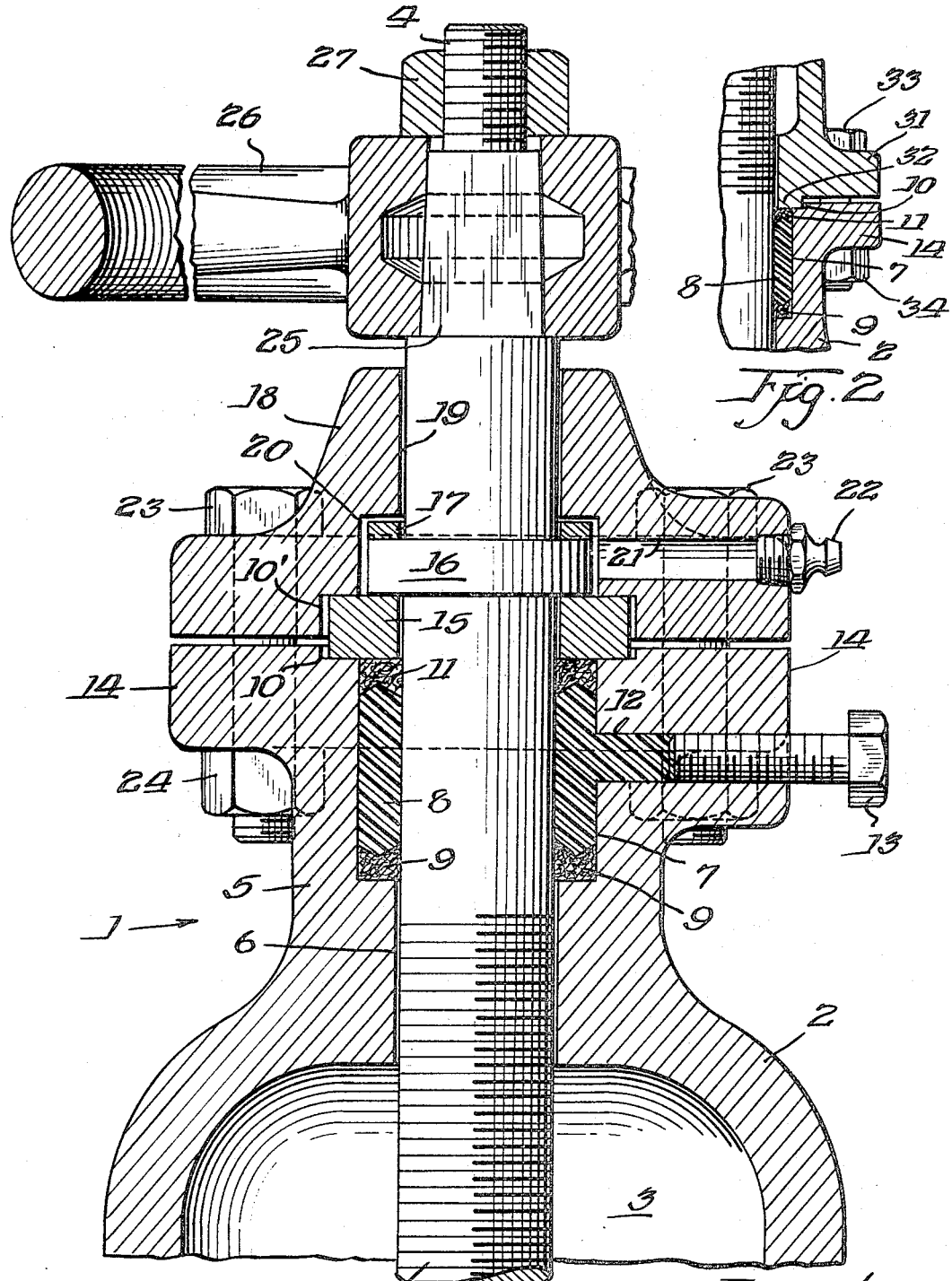

ABSTRACT OF THE DISCLOSURE

A non-rising stem gate valve utilizing an improved stuffing box construction in which the stem collar of the rotatable valve stem is positioned within a recess in a stem retaining flange above the injection type stuffing box and is provided with easily replaceable thrust bearing members on both sides of the stem collar and having lubrication means. The lower thrust bearing member also functions as a gasket between the upper flange portion of the valve bonnet and the stem retaining flange and defines the upper limit of the stuffing box.

---

This invention relates to a stuffing box, and in particular to an improved construction for a stuffing box associated with a rotating and/or reciprocating stem or shaft extending from a pressure vessel, such as a valve or pump, or other device, wherein a leakproof mounting between the vessel and stem or shaft is desired.

Heretofore, non-rising stem type valves have utilized a construction wherein the stuffing box is positioned above the valve stem thrust collar. Such positioning is frequently undesirable in that the liquid contained in the vessel, which may be of strong corrosive composition, comes in contact with the stem collar, thereby causing corrosion and/or deterioration of the valve stem collar and adjacent valve members. Further, positioning of the stem collar below the stuffing box also may cause an undesirable introduction of foreign matter in the stem collar and valve body, with which it is normally in frictional engagement therewith, resulting in undue wear on the stem collar. Such undue wear results in failure of the stem collar and adjacent parts. Positioning of the stem collar below the stuffing box also is disadvantageous where fluids which may solidify cause the valve to be inoperative. It is further appreciated that the instant invention eliminates a pressure and fluid joint, which has heretofore been used in valve construction, by virtue of the novel construction herein disclosed.

It will be further appreciated that the positioning of a thrust collar below the stuffing box is normally accomplished by seating the collar on or in a recessed portion of the valve bonnet without consideration of bearing surfaces.

Also, lubrication of the stem thrust collar, when positioned adjacent to the vessel chamber also presents a problem since excessive lubrication may introduce undesirable quantity of lubricant into the vessel chamber.

The instant invention positively overcomes the undesirable aforementioned features by providing a stuffing box construction wherein the packing is injected at an intermediate position between the valve chamber and stem collar and wherein the said collar is provided with easily lubricated, replaceable bearing members, positioned on both sides of the stem collar to compensate for stem collar wear. By positioning the stuffing box as aforementioned, it is possible to utilize the same bonnet with either a rising or non-rising type valve, a feature not previously accomplished.

It is, therefore, the primary object of this invention to provide a stuffing box of improved construction positioned in the valve bonnet which enables the bonnet to be used with either rising or non-rising stem type valves.

A further object is to provide an improved stuffing box wherein the packing is positioned so as to prevent the introduction of line fluid into the stem collar area of the valve.

It is a further object to provide a stuffing box wherein the stem thrust collar is supported on both sides by replaceable bearing members to thereby compensate for any wear on the said collar and/or bearings.

Still a further object is to provide a stuffing box wherein the conventional stuffing box gasket is eliminated.

Another object is to provide a stuffing box wherein all the bearing surfaces in the stem collar are effectively lubricated thereby insuring a constant torque for operation of the valve.

A further object is to provide a stuffing box which substantially reduces the over-all height of the valve and thereby provides a lighter weight valve.

These and other objects will become more readily apparent from the following description and drawings in which:

FIG. 1 shows a fragmentary sectional assembly view of a preferred form of a stuffing box utilized with a non-rising valve stem taken along the center line of the valve; and, FIG. 2 shows a fragmentary sectional view, in reduced scale, similar to FIG. 1, showing the adaption of the stuffing box and bonnet to a rising stem valve.

Referring to the drawings, a conventional non-rising valve, generally indicated as 1, includes a bonnet 2 having a chamber portion 3 in which is positioned a closure member (not shown) which is mounted for reciprocal axial movement on valve stem 4. The bonnet 2 has an extended neck portion 5 having a bore 6 therein to receive the valve stem 4 which extends therethrough. The bore 6 serves as a bearing for the lower portion of the valve stem 4 as the stem is rotated during operation of the valve. A circular recessed portion or stuffing chamber 7 is formed on the upper portion of the bonnet to accommodate a plastic packing 8 which is confined within the chamber 7 by upper and lower supporting rings 11 and 9, respectively. The rings 9 and 11 are of molded asbestos packing or other suitable material and are frictionally positioned in the chamber 7 to prevent axial movement of the said rings to a point which might interfere with the source of packing supplied to the chamber 7.

A channel 12, in communication between chamber 7 and the outside of the bonnet 2, provides a means to supply packing 8 to the said chamber. Screw means 13, threadedly engaged into the channel 12, permits packing 8 to be injected and uniformly dispersed under pressure into the chamber 7 in a conventional manner, as shown. The channel 12 also provides a storage area for the plastic packing.

The top portion of bonnet 2 is provided with a flange portion 14 having an annular recess 10 therein which is concentrically positioned with respect to chamber 7. The recess 10 must be of greater diameter than that of chamber 7 so that the lower stem collar thrust bearing or gasket 15 may be placed thereon, as shown.

Stem 4 has the usual thrust collar 16 found on non-rising stem type valves. The collar 16 is interposed between lower thrust bearing 15 and upper thrust bearing 17. It is noted that the placement of bearings 15 and 17 on stem 4 provides a means of convenient replacement of said bearings to compensate for any wear occurring on the respective members. Thrust bearings 15 and 17 are made of any suitable composition, which would be dependent on the particular application of the valve, and, the upper bearing could be formed on the flange member, if desired.

A stem retaining flange 18, which is positioned to retain the thrust bearings 15 and 17 and thereby restrict axial movement of stem 4, has a central bore 19. Bore 19, similar to bore 6 of bonnet 2 and in alignment therewith, serves as a guide and bearing for valve stem 4. Flange 18 has a circular recessed portion or chamber 20 which is in axial alignment with chamber 7 and of substantially equal diameter. Chamber 20 accommodates the thrust collar 16 and upper stem collar thrust bearing 17 when the stem retaining flange is positioned on the flange portion 14 of bonnet 2. It is noted that a slight clearance is provided in chamber 20, which accommodates upper thrust bearing 17 and thrust collar 16, to prevent binding of the members during operation. The portion of retaining flange 18 which is adjacent flange portion 14 of bonnet 2, also has an annular recess 10' which is concentrically positioned with respect to recess 10, for the purpose of accommodating lower stem collar thrust bearing 15. It is obvious that the combined depth of recesses 10, 10' must be less than the thickness of thrust bearing 15 so as to confine upper support ring 11.

A lubricant channel or passage 21 between flange chamber 20 and the exterior of the flange provide a means of lubricating the members 15, 16 and 17 through a conventional lubricant feed means 22 which is threadedly engaged into the stem retaining flange, as shown. Stem retaining flange 18 is secured to the bonnet flange 14 by conventional bolts 23 and nuts 24. It will be appreciated that upon securing members 14 and 18, lower thrust bearing 15 is tightly seated between the two said members. Further, lower bearing member 15 functions as a gasket between flange 14 and retaining flange 18 when the said flanges are secured by bolts 23 and nuts 24.

The end of stem 4 extending from the stem retaining flange 18 includes a tapered square shank portion 25 adapted to receive a handwheel 26 which is secured to the shank 25 by means of a handwheel nut 27, threadedly engaged on the end of the stem 4, as shown.

The convenient adaptability of the bonnet 2 for use with either rising or non-rising stem valves is appreciated with reference to FIG. 2 wherein a bonnet 2, similar in construction to the bonnet in FIG. 1, is shown in combination with a rising stem valve. For purpose of clarity, the packing supply means is not shown. Upper and lower supporting rings 9 and 11, respectively, are axially positioned in frictional engagement with the chamber 7 whereby they do not interfere with the injection of packing compound 8. Gland flange 31, having a circular ridge portion 32, is positioned in recess 10 of the bonnet 2 to thereby restrict upward axial movement of the member 11, the latter of which is subjected to packing compound pressure. Hence, ridge portion 32 performs a function similar to that performed by lower stem collar thrust bearing 15 in a non-rising stem valve, as shown in FIG. 1 and explained supra. The bonnet flange 14 and gland flange 31 are tightly secured by bolt 33 and nut 34, as shown. Additional features and disclosure of the non-rising stem type valve may be seen by reference to U.S. Patent No. 3,228,258, issued to Kurt B. Bredtschneider et al. on Jan. 11, 1966 wherein the utility of the instant invention and its application to both rising and non-rising stem type valves will be readily appreciated.

It will be evident that the application of the construction of an improved stuffing box herein disclosed is not limited to those set forth by the embodiments but may be utilized in other types of pressure vessels without departing from the scope or spirit of the instant invention.

I claim:
1. In a valve having a bonnet adaptable for use with either a rising or non-rising stem, the combination including:
    (a) a flanged neck portion having a bore therein adapted to receive a valve stem;
    (b) a recessed chamber in said neck portion along a substantial portion of the bore, said chamber forming a stuffing box adapted to receive a packing;
    (c) upper and lower retaining rings positioned at the axial limits of said chamber;
    (d) a stem extending through said bore, chamber, and retaining rings, said stem having a thrust collar;
    (e) a stem retaining flange member having a bore therein and a recessed portion along a portion of the bore adapted to receive said stem, said recessed portion adapted to receive said thrust collar;
    (f) a lower stem collar bearing member positioned between said collar and said upper retaining ring, said lower bearing member forming a gasket between said neck portion and said flange member and adapted to define an upper limit for one of said retaining rings; and,
    (g) means to secure said bonnet and flange member.

2. The structure as defined in claim 1 and further including an upper stem collar bearing member positioned on said collar in said recessed portion.

3. The structure as defined in claim 2 and further including means to supply lubricant to said bearing members and collar including; a channel between said recessed portion and the outside of said flange member; and, feed means threadedly engaged in said flange member adapted to receive a lubricant.

4. The structure as defined in claim 3 and further including; a packing material filling said chamber between said retaining rings; means to supply said packing under pressure to said chamber comprising a channel communicating with the outside of said neck portion; and, screw means threadedly engaged in said channel adapted to force packing under pressure into said chamber.

5. The structure as defined in claim 4 wherein said upper stem collar bearing member is loosely positioned on said thrust collar and stem to permit relative movement therebetween.

6. In a valve having a bonnet adaptable for use with either a rising or non-rising stem, the combination including:
    (a) a flanged neck portion having a bore therein adapted to receive a valve stem;
    (b) a cylindrical recess along a substantial portion of the bore defining a first chamber, said chamber forming a stuffing box adapted to receive a packing;
    (c) upper and lower retaining rings positioned at the axial limits of said chamber;
    (d) an annular recess adjacent to and surrounding the upper portion of said first chamber;
    (e) a stem retaining flange member having a bore and a cylindrical recess along a portion of the bore defining a second chamber, said bore and chamber adapted to receive the valve stem;
    (f) an annular recess on the lower portion of said second chamber adjacent to and concentric with said recess of said neck portion;
    (g) a stem extending through said bores, chambers and retaining rings;
    (h) a stem having an integral thrust collar positioned in said second chamber;
    (i) a lower bearing member positioned between said collar and upper retaining ring in said annular recesses, said member forming a gasket between said flanged neck portion and said flange member and adapted to define an upper limit for one of said retaining rings; and,
    (j) means to secure said bonnet and flange member.

7. The structure as defined in claim 6 and further including an upper bearing member positioned on said integral thrust stem and said collar in said second chamber.

8. The structure as defined in claim 5 and further including means to lubricate said bearing members and collar; a packing material filling said first chamber; and, means adapted to force said packing under pressure into said first chamber.

9. The structure as defined in claim 8 wherein said means to lubricate said bearing members and collar include a passage between said second chamber and the outside of said flange member; and, feed means threadedly engaged in said passage adapted to receive a lubricant.

10. The structure as defined in claim 7 wherein the depth of the annular recesses is less than the thickness of the said lower bearing member.

11. The structure as defined in claim 1 wherein said thrust collar is integral with said stem.

References Cited

UNITED STATES PATENTS

| | | | |
|---|---|---|---|
| 2,757,897 | 8/1956 | Cline | 251—355 X |
| 3,096,070 | 7/1963 | Wolfensperger | 251—355 X |
| 3,199,876 | 9/1965 | Magos et al. | 277—21 |

SAMUEL ROTHBERG, *Primary Examiner.*